United States Patent
Mukai et al.

(10) Patent No.: US 6,628,320 B2
(45) Date of Patent: Sep. 30, 2003

(54) COMMUNICATION DEVICE HAVING AN IMAGE TRANSMISSION FUNCTION

(75) Inventors: Hiromu Mukai, Osaka (JP); Hitoshi Hagimori, Osaka (JP); Minoru Kuwana, Osaka (JP); Tsutomu Honda, Osaka (JP); Kazuhiko Ishimaru, Osaka (JP); Hideki Nagata, Osaka (JP)

(73) Assignee: Minolta Co., Ltd., Osaka (JP)

( * ) Notice: Subject to any disclaimer, the term of this patent is extended or adjusted under 35 U.S.C. 154(b) by 22 days.

(21) Appl. No.: 09/902,790

(22) Filed: Jul. 12, 2001

(65) Prior Publication Data

US 2002/0057334 A1 May 16, 2002

(30) Foreign Application Priority Data

Jul. 12, 2000 (JP) .................................. 2000-211521

(51) Int. Cl.⁷ .................................................. H04N 7/12
(52) U.S. Cl. ..................................................... 348/14.01
(58) Field of Search ........................... 348/14.01, 14.08, 348/14.16, 552, 143, 207.99, 208.12, 211.12, 240.99, 361; 396/63, 72, 77–80, 133

(56) References Cited

U.S. PATENT DOCUMENTS

| | | | | |
|---|---|---|---|---|
| 4,715,059 A | * | 12/1987 | Cooper-Hart et al. ..... | 348/14.14 |
| 5,008,924 A | * | 4/1991 | Guichard et al. ......... | 348/14.05 |
| 5,122,825 A | * | 6/1992 | Tokumaru et al. ............ | 396/78 |
| 5,138,354 A | | 8/1992 | Okada et al. | |
| 5,170,427 A | * | 12/1992 | Guichard et al. ......... | 348/14.05 |
| 5,341,167 A | * | 8/1994 | Guichard et al. ......... | 348/14.05 |
| 5,764,276 A | * | 6/1998 | Martin et al. ................ | 348/552 |
| 5,864,363 A | * | 1/1999 | Giefing et al. .............. | 348/143 |
| 5,893,037 A | * | 4/1999 | Reele et al. ............. | 348/14.02 |

* cited by examiner

Primary Examiner—Wing Chan
(74) Attorney, Agent, or Firm—Morrison & Foerster LLP (57) ABSTRACT

A communication device having an image transmission function such as a video phone or a camera-equipped cellular phone. The image transmission function is capable of capturing an object image using an optimal size.

11 Claims, 10 Drawing Sheets

# COMMUNICATION DEVICE HAVING AN IMAGE TRANSMISSION FUNCTION

RELATED APPLICATION

This application is based on Application No. 2000-211521 filed in Japan, the content of which is hereby incorporated by reference.

TECHNICAL FIELD OF THE INVENTION

The present invention relates to a communication device, and more particularly to a communication device having an image transmission function such as a videophone or a camera-equipped cellular phone.

BACKGROUND OF THE INVENTION

Communication devices having an image transmission function, such as videophones and camera-equipped cellular phones, are widely commercialized. Using such a device, not only the voice but also the facial expressions of the speaker may be mutually exchanged and recognized during communication between remote locations.

However, because the focal length of the optical system included in the camera is fixed in a conventional device, when the captured image is displayed in the display unit, the object is not often displayed in the optimal size. For example, while it is desirable for a videophone or camera-equipped cellular phone to capture the image of the person who is a party to the conversation such that his or her face is displayed essentially in the center of the screen at all times, because the focal length of a conventional device is fixed, it is difficult to use the optimal size for the object image included in the displayed image.

SUMMARY OF THE INVENTION

The present invention provides a communication device having an image transmission function that is capable of capturing an object image using the optimal size.

In one embodiment of the invention, there is a communication device having an image transmission function, the device including a lens unit with a variable focal length used for capturing images; a magnification setting unit that sets the magnification used during image capture by the lens unit to a prescribed value when power is turned ON; and a lens driving unit that determines an initial focal length based on the image capture magnification set by said magnification setting unit and changes the construction of said lens unit based on said initial focal length.

In one aspect of the invention, the lens unit includes an aperture with an adjustable opening diameter, and the lens driving unit adjusts the opening diameter of said aperture based on the image capture magnification set by the magnification setting unit.

In another aspect of the invention, the magnification setting unit sets the image capture magnification, which is expressed as $\beta 1$, to a value within the range $0.003 < |\beta 1| < 0.08$. $|\beta 1|$ is an absolute number of $\beta 1$.

In yet another aspect of the invention, the device further includes switching unit that alternates the mode between a one-person image capture mode and a two-person image capture mode, and the magnification setting unit sets the image capture magnification to a smaller value when the two-person mode is selected than when the one-person image capture mode is selected.

In still another aspect of the invention, the device includes operation input unit that sets and inputs a focal length for the lens unit, and focal length changing unit that changes the initial focal length based on the focal length set and input by the operation input unit.

In another aspect of the invention, the focal length changing unit changes the initial focal length when an instruction is input from the operation input unit to change the initial focal length.

In still another aspect of the invention, the focal length changing unit changes the initial focal length each time a focal length is set and input from the operation input unit.

In another embodiment of the invention, the device includes a lens unit having a variable focal length used for capturing the image of the object; distance measuring unit that measures the distance from the object and generates distance information; and a lens driving unit that determines the optimal focal length for capturing the image of the object using a prescribed image capture magnification based on the distance information and drives the lens unit to match the optimal focal length.

In one aspect of the invention, the lens driving unit determines the optimal focal length and drives the lens unit each time the distance information changes.

In still another aspect of the invention, the device includes a lens unit having a variable focal length used for capturing the image of the object; an image processing unit that performs image processing of the image obtained through image capture of the object and determines the magnification adjustment amount required for image capture of the object using a prescribed image capture magnification; and a lens driving unit that drives the lens unit based on the magnification adjustment amount.

In yet another aspect of the invention, the image processing unit determines the magnification adjustment amount each time the image obtained through image capture of the object changes, and the lens driving unit drives the lens unit each time the magnification adjustment amount is sought.

DETAILED DESCRIPTION OF THE PREFERRED EMBODIMENTS

The embodiments of the present invention are explained below in detail with reference to the drawings.

1. First Embodiment

Figure 1:
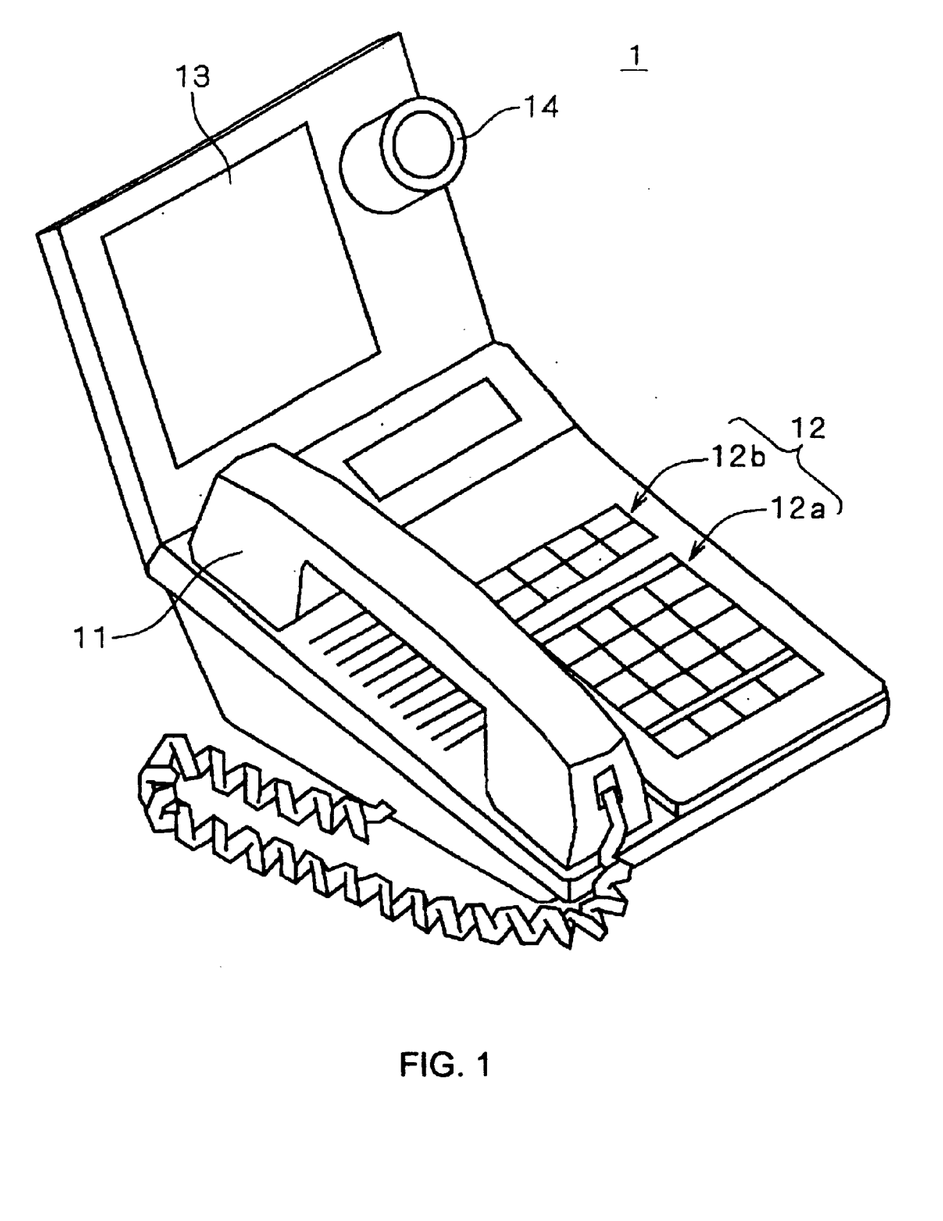
FIG. 1 is a drawing showing one example of the communication device of the present invention.

FIG. 1 is a drawing showing one example of a communication device having an image transmission function (hereinafter "communication device") of a first embodiment. This communication device 1 operates, for example, as a videophone, and includes a receiver 11, operation switches 12, a display unit 13 and a camera 14. The operation switches 12 include a switch group 12a to input the number of the call recipient as well as a switch group 12b to operate the camera 14. The display unit 13 includes a liquid crystal display or similar device, and comprises a display means on which to display the image captured by the camera 14 and the image received from the call recipient.

Figure 2:
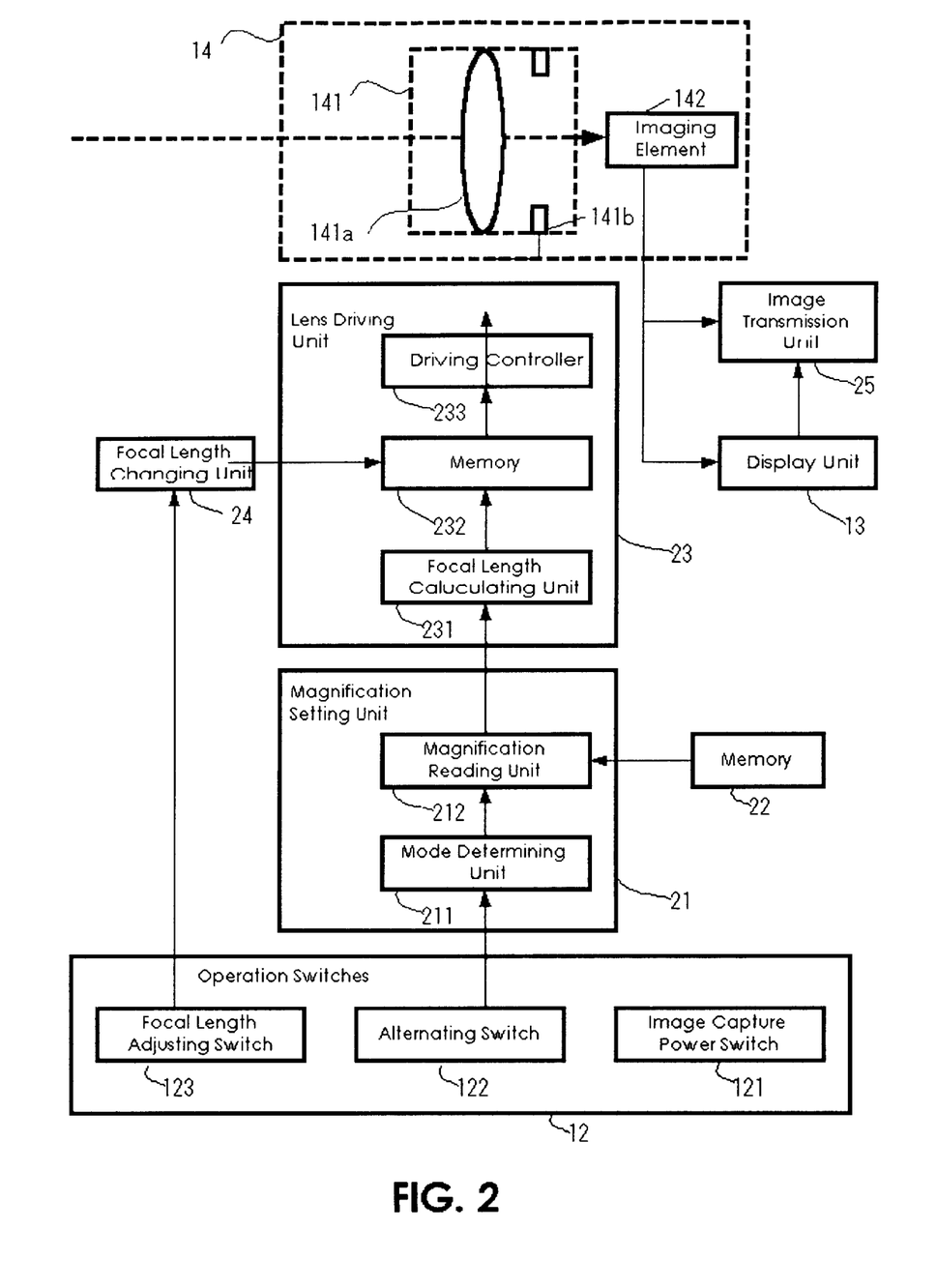
FIG. 2 is a drawing showing components of the internal construction of the communication device in the present invention.

FIG. 2 is a drawing showing components of the internal structure of the communication device 1. As shown in FIG. 2, the communication device 1 incorporates a magnification setting unit 21, a memory 22, a lens driving unit 23, a focal length changing unit 24 and an image transmission unit 25. The camera 14 has a zoom lens unit 141 the focal length of which may be changed during object image capture and an imaging element 142 comprising a CCD imaging sensor or similar device such as a CMOS sensor. The zoom lens unit 141 includes a zoom lens 141a and an aperture 141b.

The switch group 12b of the operation switches 12; which operate the camera 14; include an image capture power switch 121 that supplies power to the internal components in order to effectively use the object image capture feature of the camera 14. The switch group 12b also includes an alternating switch 122 to alternate the image capture mode, and a focal length adjustment switch 123 to change the focal length of the zoom lens unit 141 via manual operation.

The magnification setting unit 21, lens driving unit 23, focal length changing unit 24 and image transmission unit 25 are operated by a program executing unit comprising a CPU or similar unit that executes prescribed programs.

The magnification setting unit 21 operates when power is turned ON or when the image capture mode is changed. The magnification setting unit 21 operates as a mode determining unit 211 and as a magnification reading unit 212. The mode determining unit 211 identifies the image capture mode set by the alternating switch 122 and supplies that image capture mode to the magnification reading unit 212. The magnification reading unit 212 reads a pre-recorded image capture magnification from the memory 22 based on the specified image capture mode.

There are two image capture modes: a one-person image capture mode and a two-person image capture mode. A different image capture magnification for each mode is preset and stored in the memory 22.

The image capture magnifications stored in the memory 22 are set as values that allow the communication device 1, which operates as a videophone, to capture the image of the caller (i.e., the object), who is situated in front of the camera 14, at the optimal size. An image capture magnification is the ratio of the size of the object to the object image when the object image is captured via the zoom lens unit 141.

Figure 3:
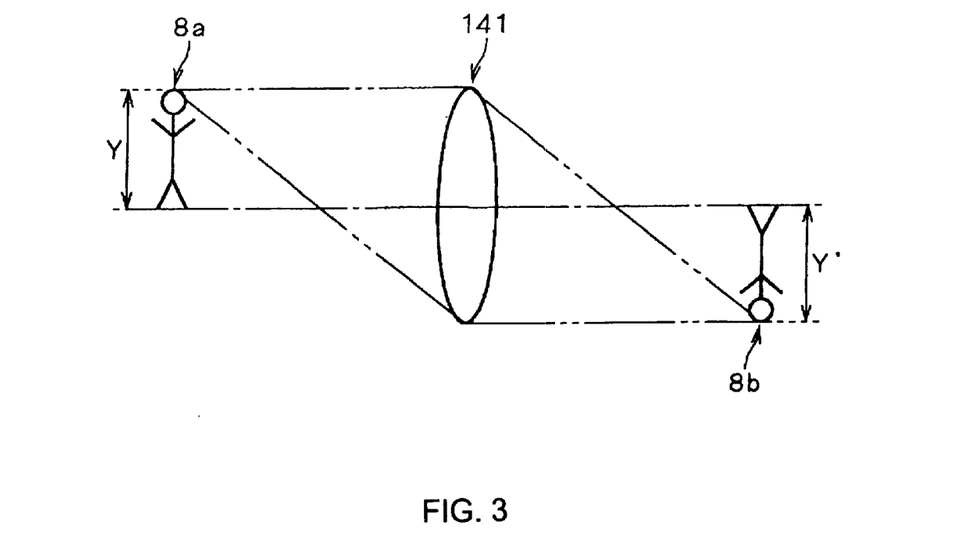
FIG. 3 is a drawing illustrating image capture magnification.

FIG. 3 is a drawing illustrating an image capture magnification. In the example of FIG. 3, when the object 8a is captured using the zoom lens unit 141, an object image 8b is formed on the light receiving surface of the imaging element 142. If the size of the object 8a is Y, the size of the object image 8b is Y', and the image capture magnification is $\beta$, the magnification $\beta$ may be obtained via the equation $\beta=-Y'/Y$. The negative symbol indicates that the object image 8b is inverted.

Figure 4:
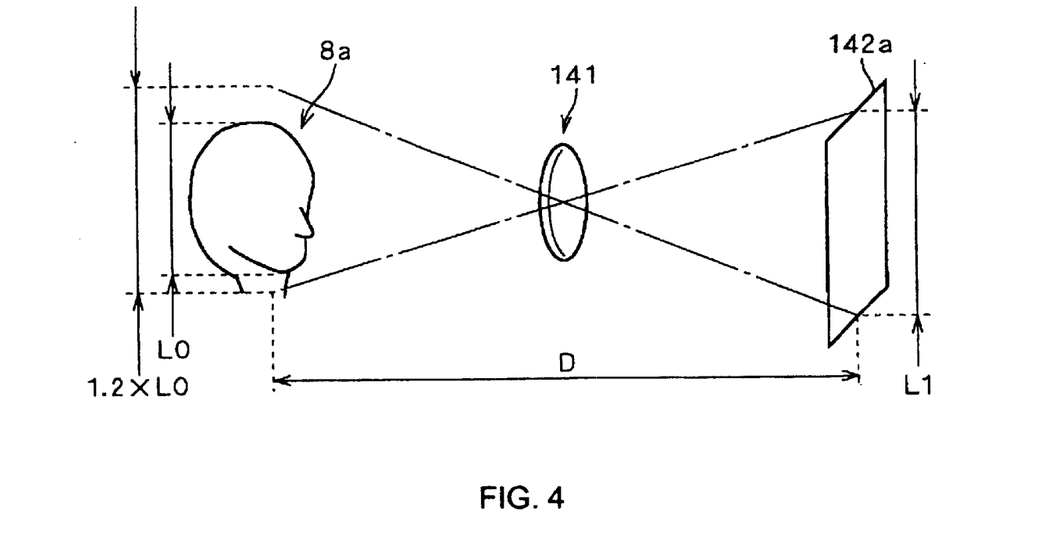
FIG. 4 is a drawing showing the relationship between an object and an object image pertaining to the communication device.

In the example above, the communication device 1, operates as a videophone, and it is sufficient if the face of the caller is captured such that it appears large on the display. FIG. 4 is a drawing showing the relationship between the object and the object image pertaining to the communication device 1. As shown in FIG. 4, if the size (the vertical length) of the face of the caller, who comprises the object 8a, is L0, an image included in the area having the size of 1.2×L0, which is larger than the face of the caller, is formed on the light receiving surface 142a of the light receiving element 142. Generally speaking, while there are some individual differences, the size L0 of a person's face is approximately 20 to 30 cm.

The size (the vertical length) L1 of the light receiving surface 142a of the imaging element 142 is preferably approximately 0.3 to 1.3 cm, if the camera 14 itself is to be made small.

When the caller forming the object 8a is one person, the object image may be captured using the optimal magnification in most cases if the image capture magnification $\beta1$ in the communication device 1 is set in the range of $0.008<|\beta1|<0.036$, based on the size conditions described above. If the image capture magnification $\beta$ is adjustable, e.g. the size of a child's face or a person wearing a hat, the range of the image capture magnification $\beta$ should preferably be set within the range $0.003<|\beta1|<0.08$. Hence, the image capture magnification $\beta1$ stored in the memory 22 for the one-person image capture mode is selected from values in the range $0.003<|\beta1|<0.08$, based on the size of the light receiving surface 142a of the imaging element 142 used in the communication device 1. This becomes the default image capture magnification for the one-person image capture mode.

For the two-person image capture mode, on the other hand, it is difficult to simultaneously capture images of two persons as the object image in an optimal fashion without reducing the image capture magnification than that used during the one-person image capture mode. In this embodiment, the image capture magnification is set to be smaller than during the one-person image capture mode is set. Specifically, if the image capture magnification for the two-person image capture mode is $\beta2$, the image capture magnification $\beta2$ is set to be within the range $|(\beta1)/4|<|\beta2|<|2\cdot(\beta1)/3|$. Hence, the image capture magnification $\beta2$ stored in the memory 22 for the two-person image capture mode is selected from the values in the range $|(\beta1)/4|<|\beta2|<|2\cdot(\beta1)/3|$ based on the size of the light receiving surface 142a of the imaging element 142 used in the communication device 1. This becomes the default image capture magnification for the two-person image capture mode.

As described above, image capture magnifications that optimize the size of the object image based on the active image capture mode are stored in the memory 22. The magnification reading unit 212 reads an image capture magnification from the memory 22 based on the specified image capture mode and supplies that image capture magnification to the lens driving unit 23.

The lens driving unit 23 comprises a focal length calculating unit 231, a memory 232 and a drive controller 233. The image capture magnification supplied by the magnification setting unit 21 is supplied to the focal length calculating unit 231.

The focal length calculating unit 231 seeks an initial focal length based on the image capture magnification obtained from the magnification setting unit 21. Where the image capture magnification is β, if the focal length is f and the object distance is D, the focal length f may be sought via the equation f=β·D. Here the object distance D is the distance between the light receiving surface 142a of the imaging element 142 and the object 8a, as shown in FIG. 4.

Figure 5:
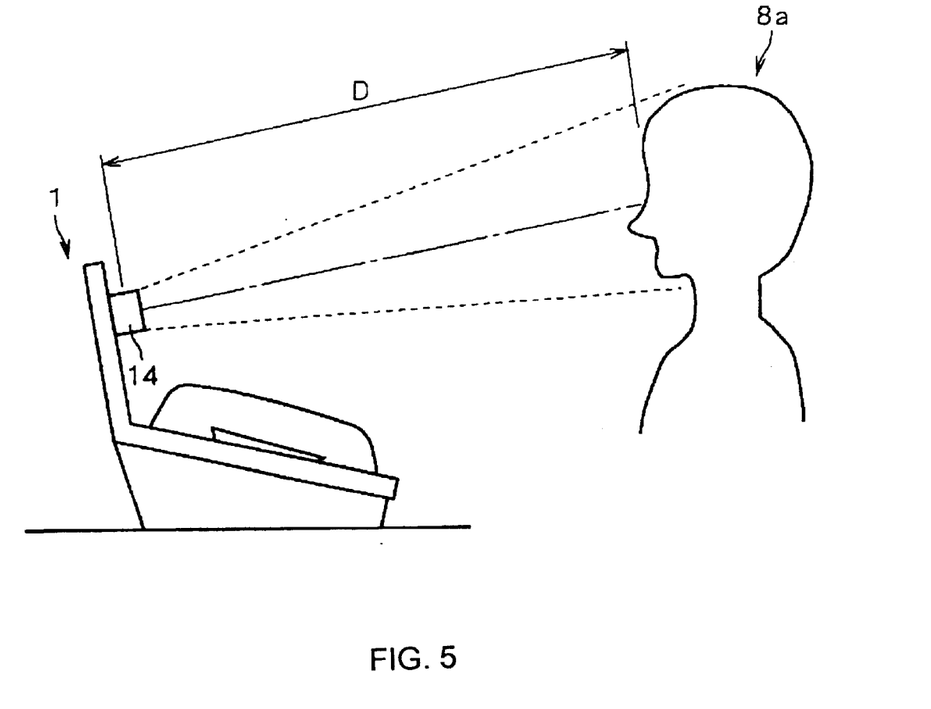
FIG. 5 is a drawing showing the positional relationship between the communication device and the caller, who comprises the object.

FIG. 5 is a drawing showing the positional relationship between the communication device 1 and the caller, displayed as the object 8a. In the communication device 1, as shown in FIG. 5, the object distance D between the caller, i.e., the object 8a, and the camera 14 may be estimated to be approximately 30 cm, for example. The focal length calculating unit 231 has values, any of which may be the estimated object distance D, and seeks the initial focal length f0 based on the object distance D and the image capture magnification β via the equation f0=β·D.

When the initial focal length f0 is obtained, the obtained value of the initial focal length f0 is stored in the memory 232.

When the initial focal length f0 is stored in the memory 232, or the focal length (including the initial focal length) stored in the memory 232 is updated by the focal length changing unit 24, the drive controller 233 drives the zoom lens 141a of the zoom lens unit 141 based on the updated focal length. The focal length of the zoom lens unit 141 is then matched to the focal length stored in the memory 232.

In other words, when an initial focal length f0 is stored in the memory 232, through the above operation of the magnification setting unit 21 and the focal length calculating unit 231, the drive controller 233 reads the initial focal length f0 from the memory 232, and drives the zoom lens 141a. As a result, the focal length of the zoom lens unit 141 is set to the optimal value for the current image capture mode when power is turned ON based on the image capture magnification corresponding to that image capture mode.

As stated above, the image capture magnification set by the magnification setting unit 21, after reading the memory 22, is set based on an estimated object position. Hence, it is possible this setting may not provide the optimal focal length during actual capture of the object image. In such a case, the focal length having been set based on the initial focal length f0 may be changed by the caller, i.e., the object himself or herself, via operation of the focal length adjustment switch 123 comprising one of the operation switches 12.

The focal length changing unit 24 operates when the focal length adjustment switch 123 (included in the operation switches 12) is operated, and changes or updates the initial focal length f0 stored in the memory 232 based on the input information from the focal length adjustment switch 123. The focal length changing unit 24 also directly communicates the amount of operation of the focal length adjustment switch 123 to the drive controller 233, so that the drive controller 233 can perform lens driving.

When the caller changes the focal length of the zoom lens unit 141 by operating the focal length adjustment switch 123, the depth of field also changes. Therefore, in order to prevent the depth of field from changing as the focal length of the zoom lens unit 141 changes, the diameter of the opening of the aperture 141b should be adjusted.

Figure 6:
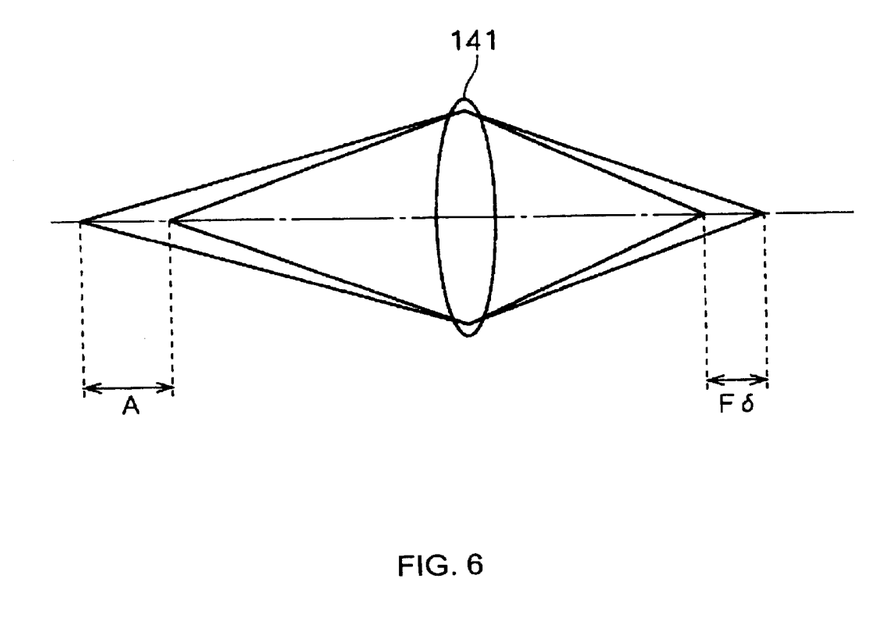
FIG. 6 is a drawing illustrating the concept of depth of field.

FIG. 6 is a drawing illustrating the concept of depth of field. As shown in FIG. 6, if the focal length of the zoom lens unit 141 is f, the F-number is F, and the degree of tolerated blur on the image plane is σ, the depth of focus may be expressed as Fσ. Here, if the depth of field is A, it is expressed by the following equation.

$$A=f^2/F\sigma+f \qquad \text{[Equation 1]}$$

If the depth of field A is assumed to be constant, the F-number F is expressed by the following equation.

$$F=1/\sigma(f^2/A-f) \qquad \text{[Equation 2]}$$

Therefore, in order to prevent the depth of field from changing as the focal length f of the zoom lens unit 141 changes, the drive controller 233 should seek the F-number F that corresponds to the focal length f using equation 2. Additionally, the opening diameter of the aperture 141b should be adjusted based on the F-number obtained. When the drive controller 233 adjusts the opening diameter of the aperture 141b, the depth of field may be maintained at a constant level at the value A, and the image obtained by the imaging element 142 may be maintained at a constant quality.

The object image formed on the imaging element 142 via the zoom lens unit 141 undergoes photoelectric conversion by the imaging element 142, which generates image data. The image data obtained from the imaging element 142 is supplied to the image transmission unit 25 and the display unit 13. The image transmission unit 25 has a feature in which it transmits the image data obtained from the imaging element 142 to the other communication device connected (i.e., communicating) to the communication device 1, enabling them to communicate with each other.

The display unit 13 performs an image display based on the image data obtained from the imaging element 142. Through this display, the caller can determine whether the caller's image is being captured using the optimal focal length. Further, the display unit 13 performs an image display based on the image data received from the other communication device that is connected to the communication device 1, enabling the caller to see the image of the call recipient.

Figure 7:
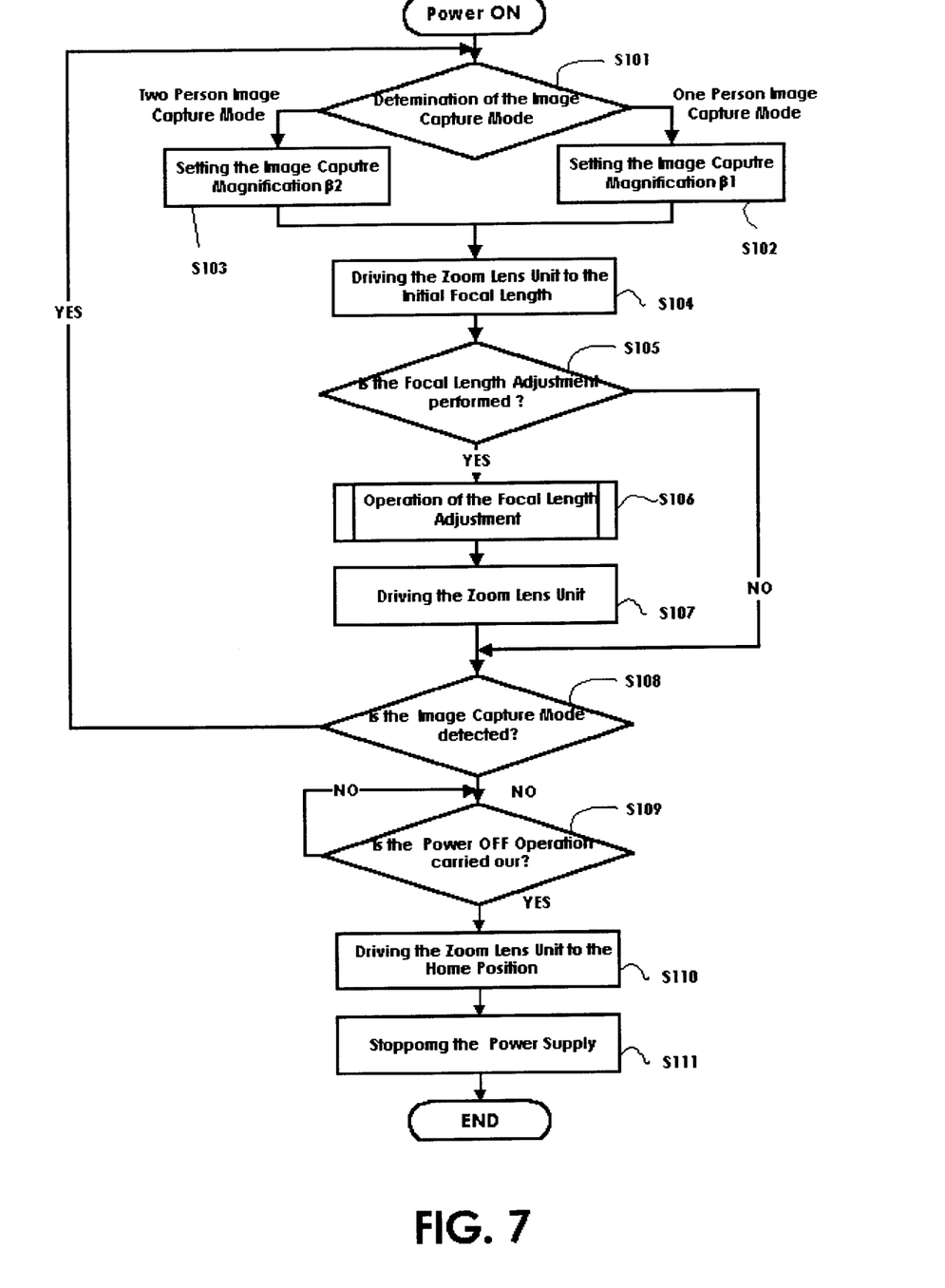
FIG. 7 is a flow chart showing an exemplary processing sequence in the communication device.
Figure 8:
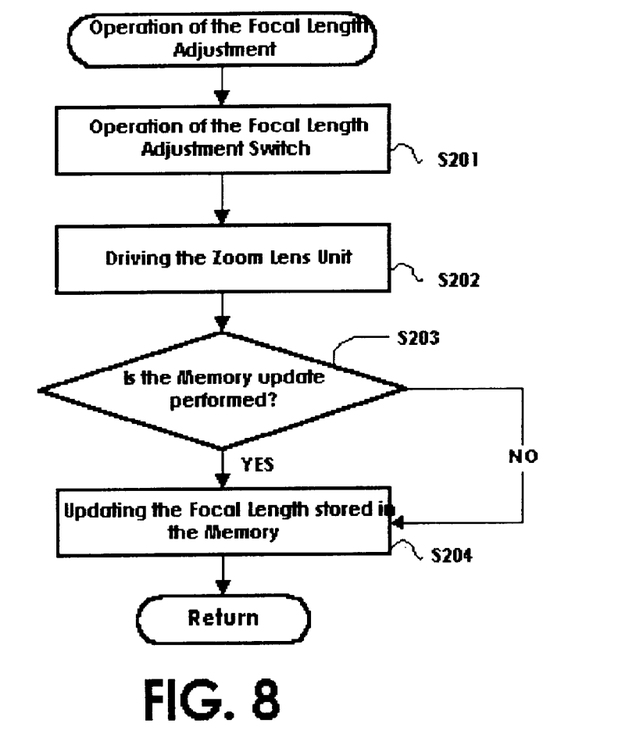
FIG. 8 is a flow chart showing an exemplary processing sequence in the communication device.
Figure 9:
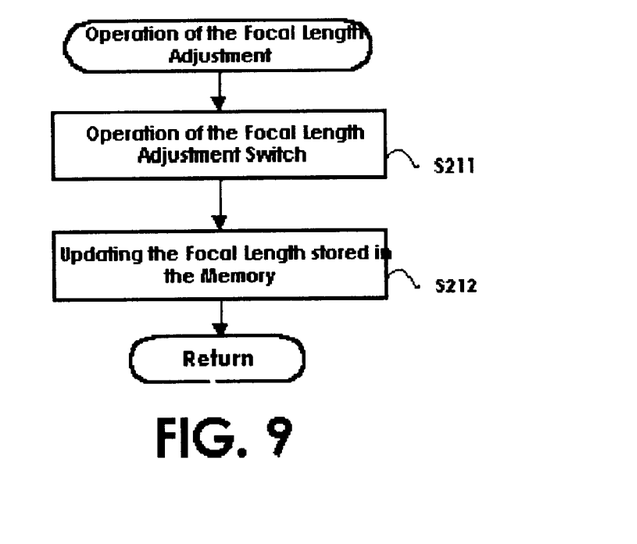
FIG. 9 is a flow chart showing an exemplary processing sequence in the communication device.

Operation after the caller operates the image capture power supply switch 121, to supply power to activate the image capture feature of the communication device 1, will now be explained. FIGS. 7 through 9 are exemplary flow charts showing the processing sequence in the communication device 1.

As shown in FIG. 7, when the caller operates the image capture power switch 121, power is supplied to each component described above. In S101, the mode determining unit 211 determines the image capture mode to be activated. Where the determination indicates a one-person image capture mode, the device advances to S102, and where the determination indicates a two-person image capture mode, the device advances to S103.

In S102, the magnification reading unit 212 reads the image capture magnification β1 for the one-person image capture mode from the memory 22. In S103, the magnification reading unit 212 reads the image capture magnification β2 for the two-person image capture mode from the memory 22, and supplies it to the lens driving unit 23.

The device then advances to S104, in which the lens driving unit 23 drives the zoom lens 141a such that the focal length thereof matches the initial focal length based on the magnification β1 or β2 obtained in S102 or S103. When this occurs, the image obtained by the imaging element 142 is displayed in the display unit 13, and by visually checking the image captured using the initial focal length, the caller can determine whether the image is being captured using the optimal size.

It is then determined whether a focal length adjustment has been performed by the caller via operation of the focal length adjustment switch 123 (S105). Where focal length adjustment has not been performed, the device advances to S108, and where focal length adjustment has been performed, the device advances to S106.

In S106, the caller performs a focal length adjustment, whereupon the focal length (the initial focal length) stored in the memory 232 is changed. The focal length changes in one of two ways: it changes due to a manual operation by the caller or automatically.

FIG. 8 is a flow chart showing the processing sequence wherein a memory update is carried out via manual operation. FIG. 9 is a flow chart showing the processing sequence wherein a memory update takes place automatically in a sequential manner.

The processing sequence wherein a memory update is performed via manual operation will first be explained. As shown in FIG. 8, the focal length adjustment switch 123 is operated by the caller in S201. The lens driving unit 23 then drives the zoom lens 141a based on this operation, and changes the focal length (S202). When this happens, an image corresponding to the changed focal length is displayed in the display unit 13, enabling the caller to visually check whether an image capture has been performed using the optimal image size. Where the caller decides (after checking the image displayed on the display unit 13) that the image is being displayed in the optimal image size, the memory rewrite operation is performed (S203). Consequently, the focal length stored in the memory 232 is updated to the focal length changed by the caller (S204). On the other hand, where a memory rewrite was not carried out in S203, the process ends without rewriting to the memory 232 being performed.

Since the focal length stored in the memory 232 is used as the default focal length value for the zoom lens unit 141 when power is turned ON, when rewriting takes place in S204, the zoom lens 141a is driven based on the focal length set by the caller when power is turned ON the next time.

The processing sequence carried out when a memory update is automatically performed in a sequential manner will now be explained. As shown in FIG. 9, the caller operates the focal length adjustment switch 123 in S211. The lens driving unit 23 changes the focal length stored in the memory 232 based on this operation (S212). As a result, each time the caller operates the focal length adjustment switch 123, the default focal length value is also updated, such that the caller need not perform an input operation to update the default focal length. In addition, when the caller performs an input operation using the focal length adjustment switch 123, the focal length is set such that the image displayed becomes the optimal image size in accordance with the preference of the caller.

The method by which the device learns and stores in memory the caller's preferred image size is illustrated in the flow chart of FIG. 9. When power is turned ON the next time, the zoom lens 141a is driven based on the focal length set by the caller.

As described above, the focal length is adjusted in S106 of FIG. 7, and either the processing sequence of FIG. 8 or FIG. 9 may be used. It is also acceptable if the construction of the device is such that the processing sequence of FIG. 8 or 9 may be selected as the operation mode for a memory update.

In S107, the zoom lens 141a is driven to the position matching the focal length ultimately set by the caller.

The device then advances to S108, in which it is determined whether the image capture mode has been changed. This determination is made based on whether a trigger from the alternating switch 122 has been detected by the magnification setting unit 21. When the image capture mode has been changed, the device returns to S101 and repeats the above processes.

Where no change of the image capture mode is detected, it is determined in S109 whether a power OFF operation has been carried out. Where such operation has been carried out, the device advances to S110 and returns the zoom lens 141a to the home position (the position before power was turned ON). The power supply to the above various components is then stopped, whereupon the processing comes to an end (S111).

As explained above, in the communication device 1 of this embodiment, the object image is captured using a zoom lens unit 141 having a variable focal length. Since (i) the magnification setting unit 21 sets the magnification for image capture by the zoom lens unit 141 to a prescribed value when power is turned ON, (ii) the lens driving unit 23 determines the initial focal length f0 based on the image capture magnification set by the magnification setting unit 21, and (iii) the zoom lens unit 141 is driven based on this initial focal length f0, the object image may be captured using the optimal size immediately after power is turned ON.

In addition, because the zoom lens unit 141 has an aperture 141b having an adjustable opening diameter, which is adjusted by the lens driving unit 23 based on the image capture magnification set by the magnification setting unit 21, the depth of field may be maintained at a constant level during image capture.

Additionally, when the two-person image capture mode is selected, the magnification setting unit 21 sets the image capture magnification to be smaller than when the one-person image capture mode is selected. Hence, image capture may be performed using the optimal image size during image capture using the two-person image capture mode as well.

In the communication device 1, the initial focal length is changed based on the focal length set and input using the operation switch 12 that operates as an operation and input unit. In this regard, the caller can specifically designate a preferred size, and the object image may be captured using the designated size. In particular, if the device is constructed such that the initial focal length is changed when an instruction is input from the operation switch 12 to change the initial focal length, the focal length setting may be carried out based on the intent of the caller. In addition, if the device is constructed such that the initial focal length is changed each time a focal length is set and input using the operation switch, the changed focal length may be automatically stored in memory.

2. Second Embodiment

Figure 10:
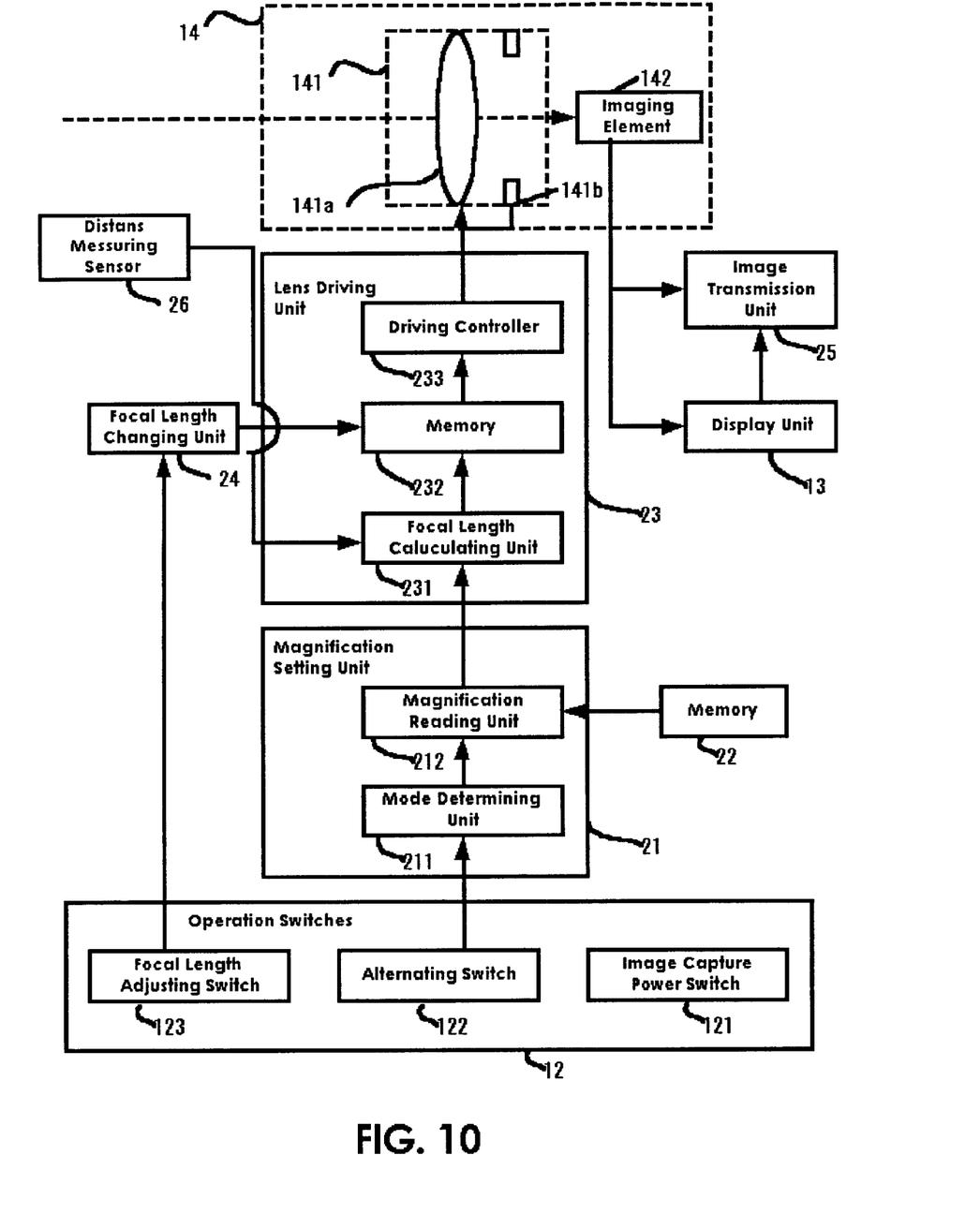
FIG. 10 is a drawing showing components of the internal construction of the communication device of another embodiment of the present invention.

A second embodiment of the present invention will now be explained. FIG. 10 is a drawing showing components of the internal construction of the communication device 1a of this embodiment. In FIG. 10, component members similar to the component members explained above are assigned the same numbers, and explanation thereof is omitted in this section.

The communication device 1a differs from the communication device 1 of the first embodiment in the following respect. The second embodiment has a distance measuring sensor 26. The distance measuring sensor 26 is a sensor that measures the object distance D (see FIG. 4) from the object using the external light passive method, for example, and is a type of distance measuring sensor that is often incorporated in general camera devices. The object distance D detected by this distance measuring sensor 26 is supplied to the focal length calculating unit 231.

The focal length calculating unit 231 seeks the focal length f via the equation f=β·D based on the image capture magnification β obtained from the magnification setting unit 21 and the object distance D obtained from the distance measuring sensor 26.

In the first embodiment, the object distance D was an estimated distance obtained by estimating the position of the object during a call. By contrast, the focal length f sought by the focal length calculating unit 231 (based on the object distance D obtained by a distance measuring sensor 26) is more accurate and corresponds to the actual position of the caller. Consequently, the initial focal length f0 stored in the memory 232 also becomes more accurate. The focal length is obtained in response to the actual position of the caller when power is turned ON, and it is more likely that the image captured immediately after power is turned ON is of the optimal size.

The distance measuring sensor 26 also sequentially detects the object distance D. The sequentially detected object distance D is supplied to the focal length calculating unit 231.

Each time the object distance D is input from the distance measuring sensor 26, the focal length calculating unit 231 determines the focal length f (based on the object distance D input and the image capture magnification β supplied from the magnification setting unit 21), and updates the focal length stored in the memory 232. The drive controller 233 reads the updated focal length from the memory 232 and drives the zoom lens 141a each time the focal length stored in the memory 232 is updated. As a result, the image obtained by the imaging element 142 is of the optimal size.

The communication device 1a is constructed such that the optimal focal length for image capture of the object, using a prescribed image capture magnification β, may be obtained based on the distance information (the object distance D). The distance information is obtained by the distance measuring sensor 26. The lens driving unit 23 drives the zoom lens unit 141 to the optimal focal length, and an image in which the object image is of the optimal size may be generated. Since the distance measuring sensor 26 can generate distance information when the object distance D changes, and because the lens driving unit 23 determines the optimal focal length and drives the zoom lens unit each time the distance information changes (even when the object distance D changes because the object moves) an image of the optimal sie can be captured.

3. Third Embodiment

Figure 11:
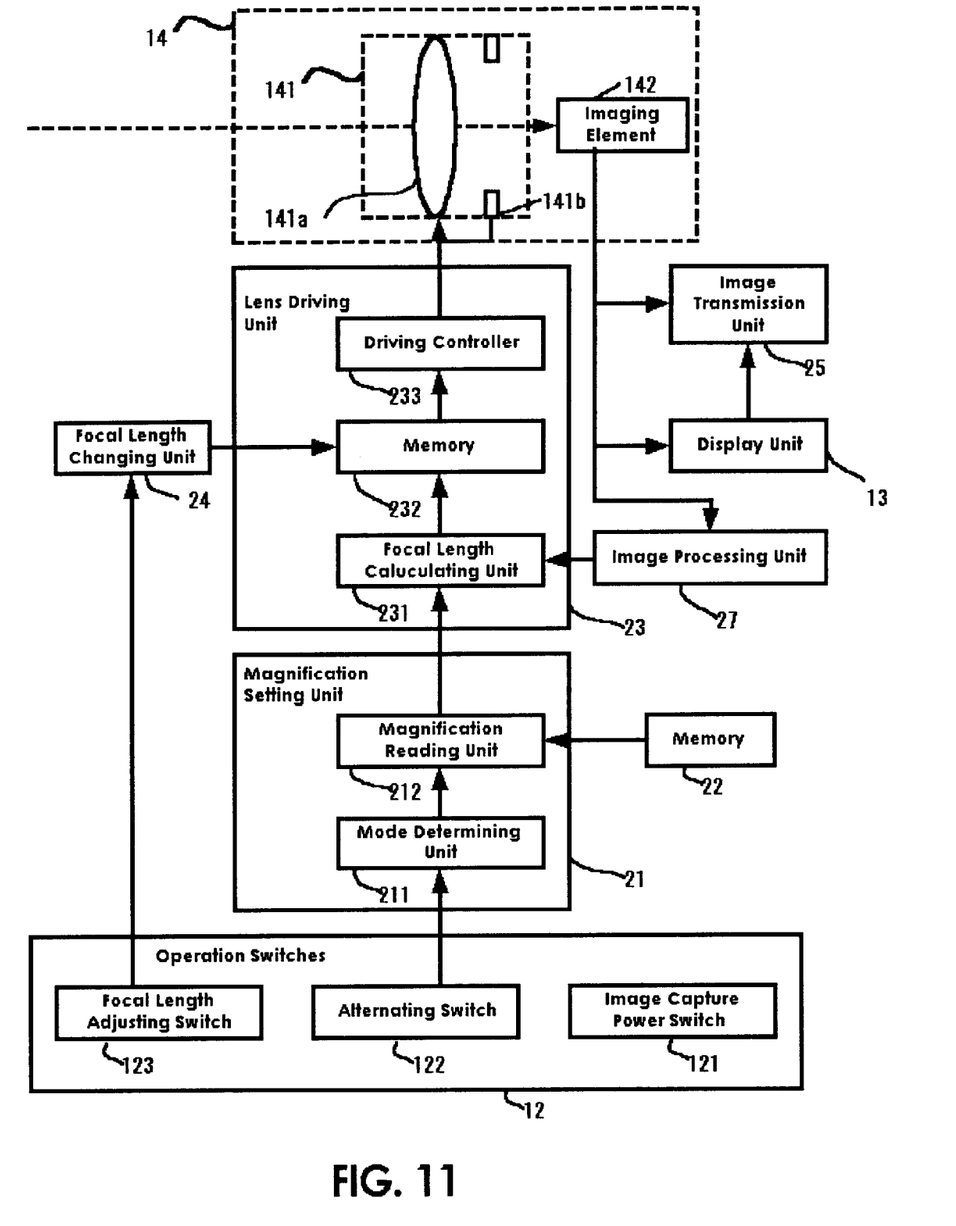
FIG. 11 is a drawing showing components of the internal construction of the communication device of another embodiment of the invention.

A third embodiment of the present invention will now be explained. FIG. 11 is a drawing showing components of the internal construction of the communication device 1b in this embodiment. In FIG. 11, component members similar to component members explained above are assigned the same numbers, and explanation thereof is omitted in this section.

The communication device 1b differs from communication devices 1 and 1a in the other embodiments because it includes an image processing unit 27. The image processing unit 27 inputs the image obtained by the imaging element 142 and analyzes the size of the object image included in the captured image.

Figure 12:
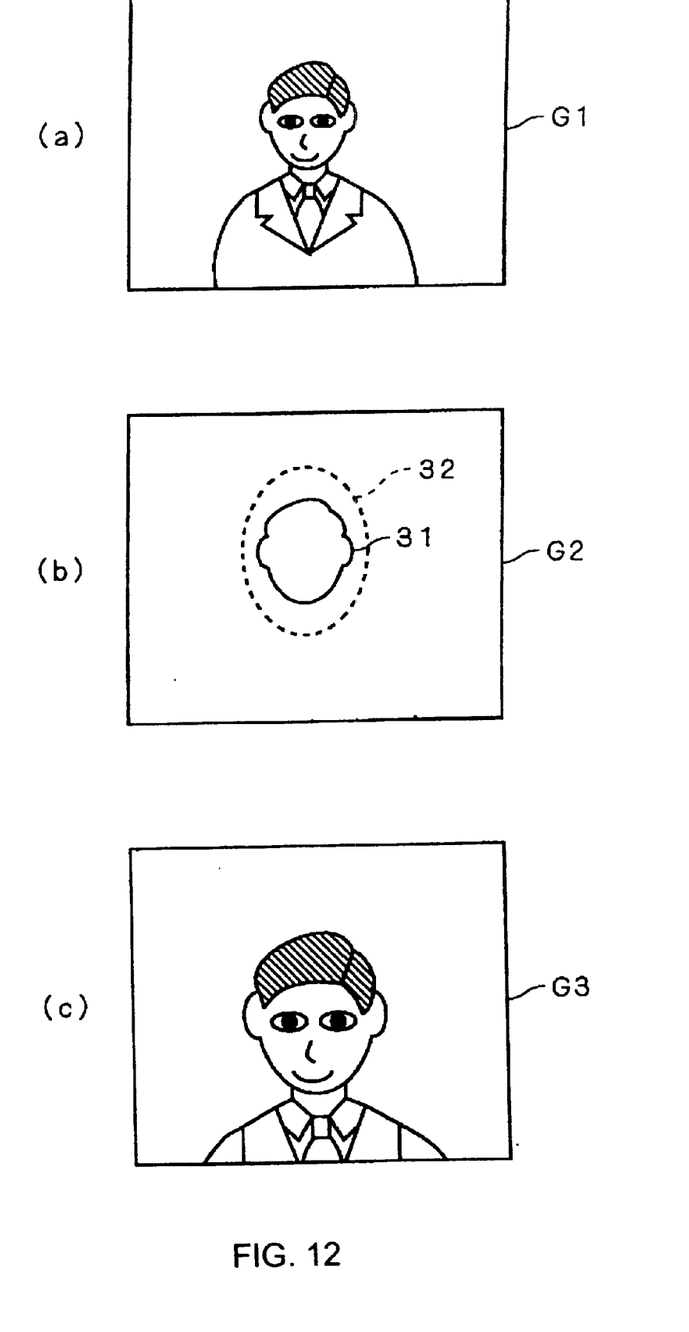
FIG. 12 is a drawing showing exemplary contents of image processing performed by the image processing unit.

FIG. 12 is a drawing showing the contents of the image processing performed by the image processing unit 27. In this example, the image G1 shown in FIG. 12(a) was input from the imaging element 142 to the image processing unit 27. When an image G1 (shown in FIG. 12(a)) is input, the image processing unit 27 extracts the contour line of the face of the caller, i.e., the object. As a result, the image G2 (shown in FIG. 12(b)) is obtained.

The image processing unit 27 compares the face contour line 31 obtained through contour extraction and the virtual contour line 32 that sets forth the optimal image size for the face. The image processing unit 27 then determines the magnification adjustment amount to make the face of the caller substantially match the virtual contour line 32. The image processing unit 27 then supplies that magnification adjustment amount to the focal length calculating unit 231.

The focal length calculating unit 231 determines the focal length based on the magnification adjustment amount obtained from the image processing unit 27, and stores it in the memory 232. As a result, the drive controller 233 drives the zoom lens 141a in accordance with the magnification adjustment amount obtained by the image processing unit 27. The image obtained via the zoom lens unit 141 becomes the image G3 in which the contour line 31 of the face of the caller substantially matches the virtual contour line 32 (see FIG. 12(c)).

In other words, this embodiment has a feedback control system that ensures an optimal object image size based on the image captured.

The image processing unit 27 analyzes the image obtained from the imaging element 142, extracts the contour line 31 of the face and compares it with the virtual contour line 32. The focal length calculating unit 231 determines a focal length based on the magnification adjustment amount sequentially obtained from the image processing unit 27, and the drive controller 233 drives the zoom lens 141a.

The communication device 1b of this embodiment is constructed such that the lens is driven after a focal length for the zoom lens unit 141 is sought in accordance with the size of the object image included in the captured image. Even if the size of the object image changes, and regardless of the size of the face of the caller, an image capture may be performed such that the object image is of the optimal size.

4. Fourth Embodiment

The present invention was explained above using embodiments thereof, but it is not limited to these embodiments.

In the embodiments described above, the communication device 1, 1a or 1b was described as a desktop communication device having an image transmission function as shown in FIG. 1. The present invention is not , however, limited to this implementation. It may also be implemented, for example, as a portable communication device having an image transmission function.

Figure 13:
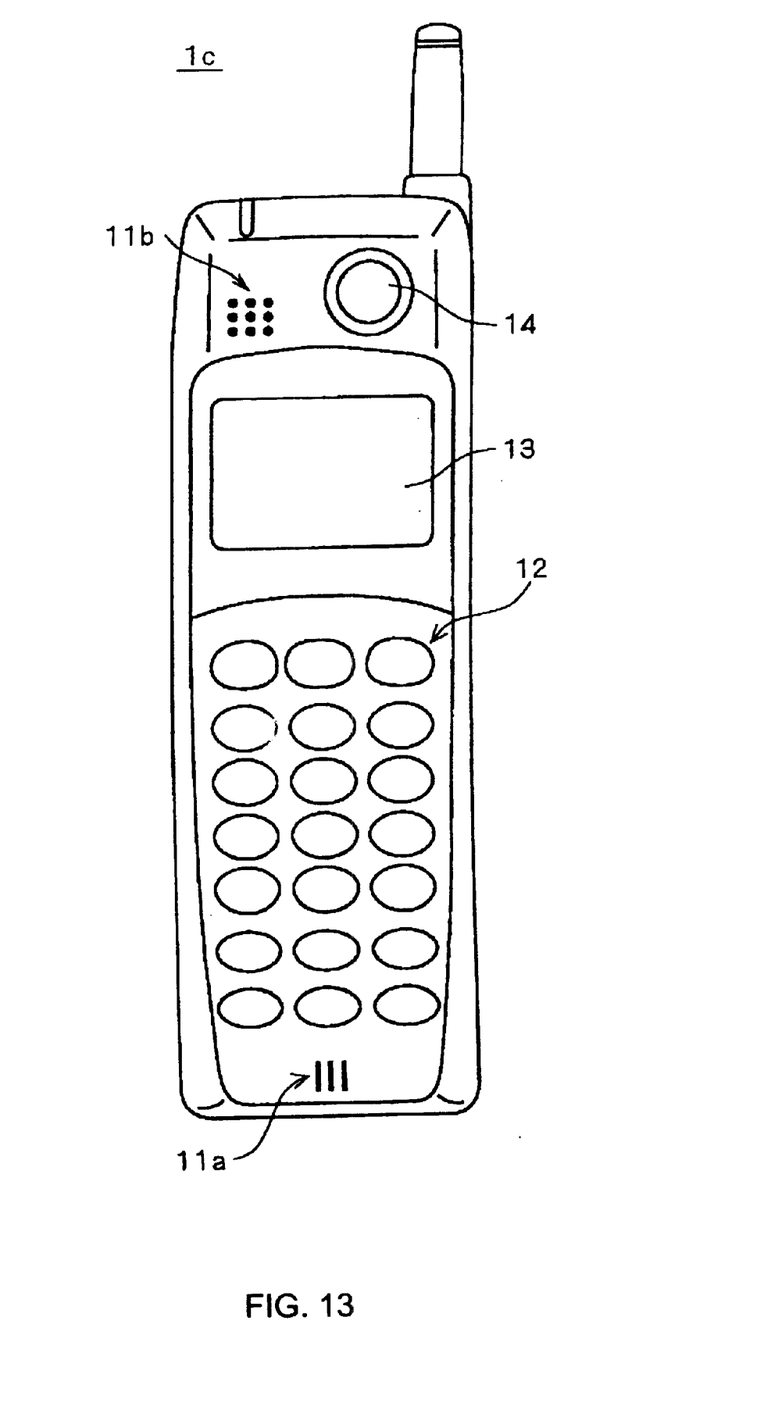
FIG. 13 is a drawing showing one example of a portable communication device.

FIG. 13 is a drawing showing one example of a portable communication device 1c having an image transmission function. As shown in FIG. 13, the communication device 1c comprises a camera-equipped cellular phone 14. Therefore, the communication device 1c includes a sound input unit 11a such as a microphone, a sound output unit 11b such as a speaker, an operation switch 12, a display unit 13, and a camera 14. The image captured by the camera 14 may be displayed in the display unit 13 comprising a liquid crystal display or a similar device, and may be transmitted wirelessly to a call recipient. Of course, the communication device 1c could also be a WAP, hand held device, portable computer, etc.

By constructing the internal components of such a portable communication device 1c in the same way as the communication device of each embodiment explained above, the object image may be captured using the optimal size.

In addition, while the explanation above used a zoom lens as an example, the focal length variation range need not necessarily be continuous.

In one embodiment, the magnification for image capture via the lens unit is set when power is turned ON, an initial focal length is sought based on the image capture magnification, and the construction of the lens unit is changed, the object image may be captured using the optimal size immediately after power is turned ON.

In another embodiment, the lens driving unit adjusts the opening diameter of the aperture included in the lens unit based on the image capture magnification, and the depth of field and the quality of the image obtained may be maintained at a constant level.

In still another embodiment, the image capture magnification β1 is set to a value within the range $0.003<|\beta 1|<0.08$, and the object image may be captured using the optimal size appropriate for the communication device.

In yet another embodiment, the magnification setting unit sets the image capture magnification to be smaller when the two-person image capture mode is selected than when the one-person image capture mode is selected, and the image may be captured using the optimal size when the two-person image capture mode is active as well.

In another embodiment, the initial focal length is changed based on the focal length set and input from the operation input unit, the image size that is automatically set may be changed, and image capture is performed using the post-change image size as the optimal size.

In still another embodiment, the initial focal length is changed when an instruction is input from the operation input unit to change the initial focal length, and the initial focal length may be changed in accordance with the user's preference.

In another embodiment, the initial focal length may be changed each time a focal length is set and input from the operation input unit, the initial focal length may be automatically changed.

In another embodiment, the optimal focal length for image capture using a prescribed image capture magnification is sought based on the distance information obtained from the distance measuring unit, and the lens unit is driven to match the optimal focal length, images of the optimal size may be obtained with high accuracy.

In still another embodiment, the lens driving unit determines the optimal focal length each time the distance information changes, and drives the lens unit, images of the optimal size may be obtained.

In yet another embodiment, because the magnification adjustment amount for capture of the object image using a prescribed image capture magnification is sought by performing image processing of the image obtained through capture of the image of the object, and the lens unit is driven based on the magnification adjustment amount, images of the optimal size may be obtained with high accuracy.

In another embodiment, because the image processing unit determines the magnification adjustment amount each time the image obtained through image capture of the object changes, and the lens driving unit drives the lens unit each time the magnification adjustment amount is sought, images of the optimal size may be obtained.

What is claimed is:

1. A communication device having an image transmission function, the device comprising:

a lens unit with a variable focal length used for capturing images;

a photographing mode setting unit to set a photographing mode concerns object;

a magnification setting unit to set the magnification used during image capture by the lens unit to a predetermined value according to the photographing mode when power is turned ON; and a lens driving unit to determine an initial focal length based on the image capture magnification set by the magnification setting unit, and to drive the lens unit based on the initial focal length.

2. The communication device according to claim 1, wherein the lens unit includes an aperture with an adjustable opening diameter, and the lens driving unit adjusts the opening diameter of the aperture based on the image capture magnification set by the magnification setting unit.

3. The communication device according to claim 1, wherein the magnification setting unit sets the image capture magnification (β1) to a value within the range $0.003<|\beta 1|<0.08$.

4. The communication device according to claim 1, wherein the device further comprises:

a switching unit to alternate a mode of the device between a one-person image capture mode and a two-person image capture mode, wherein the magnification setting unit sets the image capture magnification to a smaller value when the two-person mode is selected than when the one-person mode is selected.

5. The communication device according to claim 1, wherein the device further comprises:

an operation input unit to set and input a focal length for the lens unit; and a focal length changing unit to change the initial focal length based on the focal length set and input by the operation input unit.

6. The communication device according to claim 5, wherein the focal length changing unit changes the initial focal length when an instruction is input from the operation input unit to change the initial focal length.

7. The communication device according to claim 5, wherein the focal length changing unit changes the initial focal length each time a focal length is set and input from the operation input unit.

8. A communication device having an image transmission function, the device comprising:

a lens unit having a variable focal length used for capturing the image of an object;

a photographing mode setting unit to set a photographing mode from a plurality of photographing modes concerns object, the plurality of photographing modes define a predetermined image capture magnification respectively;

a distance measuring unit to measure the distance from the object and to generate distance information; and a lens driving unit to determine the optimal focal length for capturing the image of the object using the predetermined image capture magnification based on the distance information and to drive the lens unit to match the optimal focal length.

9. The communication device according to claim 8, wherein the lens driving unit determines the optimal focal length and drives the lens unit each time the distance information changes.

10. A communication device having an image transmission function, the device comprising:

a lens unit having a variable focal length used for capturing the image of an object;

a photographing mode setting unit to set a photographing mode from a plurality of photographing modes concerns object, the plurality of photographing modes defining a predetermined image capture magnification respectively;

an image processing unit to perform image processing of the image obtained through image capture of the object and to determine a magnification adjustment amount required for image capture of the object using the predetermined image capture magnification; and a lens driving unit to drive the lens unit based on the magnification adjustment amount.

11. The communication device according to claim 10, wherein the image processing unit determines the magnification adjustment amount each time the image changes, and the lens driving unit drives the lens unit each time the magnification adjustment amount is sought.

* * * * *